United States Patent
Taylor

[11] 3,957,341
[45] May 18, 1976

[54] PASSIVE FREQUENCY-SELECTIVE OPTICAL COUPLER

[75] Inventor: Henry F. Taylor, San Diego, Calif.

[73] Assignee: The United States of America as represented by the Secretary of the Navy, Washington, D.C.

[22] Filed: Sept. 3, 1974

[21] Appl. No.: 502,596

[52] U.S. Cl. .......................... 350/96 C; 350/96 WG
[51] Int. Cl.² .......................................... G02B 5/14
[58] Field of Search .................... 350/96 C, 96 WG

[56] References Cited
UNITED STATES PATENTS

| | | | |
|---|---|---|---|
| 3,589,794 | 6/1971 | Marcatili | 350/96 WG |
| 3,785,717 | 1/1974 | Croset et al. | 350/96 WG |
| 3,820,871 | 6/1974 | Croset et al. | 350/96 WG |

OTHER PUBLICATIONS

Marcatili, Article in *The Bell System Technical Journal* Sept. 1969, pp. 2071–2102.
Taylor, Article in *Journal of Applied Physics* July 1973, pp. 3257–3262.

*Primary Examiner*—David H. Rubin
*Attorney, Agent, or Firm*—R. S. Sciascia; G. J. Rubens; J. W. McLaren

[57] ABSTRACT

A passive frequency-selective optical coupler comprises first and second dielectric waveguides disposed in proximate (preferably parallel) spatial disposition relative to each other. A phase propagation constant at a known frequency is common to guided modes of both dielectric waveguides while the phase propagation constants of the guided modes at all other frequencies are different. The portion of the waveguides which are arranged in proximate spatial disposition extends over a sufficient length for selectively coupling light energy between the two dielectric waveguides at the known frequency only, without coupling a significant amount of light energy at any other frequencies. Signal transmission in the form of light energy may therefore be multiplexed for transmission along one of the dielectric waveguides, with selective coupling of only the known predetermined frequency to the other dielectric waveguide at that portion where the waveguides are arranged in proximate spatial disposition relative to each other.

9 Claims, 8 Drawing Figures

PASSIVE FREQUENCY-SELECTIVE OPTICAL COUPLER

BACKGROUND OF THE INVENTION

In optical communication and data transmission systems it is desirable to be able to couple light energy into and out of optical paths which carry signal information. In the prior art light energy has been coupled out of optical paths in such systems by the use of a grating coupler, for instance, in passive or active forms, as well as through the use of a prism coupler, among other techniques. It has also been suggested by S. E. Miller in Volume 48 of the Bell System Technical Journal beginning at page 2059 that active forms of frequency selective coupling between light paths may be possible through the use of integrated optical circuits.

The frequency dependence of coupling light energy between two identical parallel dielectric waveguides has been theoretically predicted in a number of published scientific articles such as that of A. L. Jones which appeared in Volume 55, of the *Journal of the Optical Society of America*, beginning at page 261. Such coupling of light energy has also been reported by N. S. Kapany et al in Volume 58 in the *Journal of the Optical Society of America* beginning at page 1176 as having been experimentally observed in nearly identical glass fibers.

There exists, however, a need for a passive optical coupler which is frequency-selective in its operation for transferring light energy only at known and predeterminable frequencies, in which the frequency selectivity is much more pronounced than that known in the prior art. In many optical systems it is desirable that different signal information be carried at different optical frequencies so that a single optical transmission line may be employed to multiplex a plurality of signals, each conveying its own signal information at a different pre-selected and predetermined frequency. There is therefore a requirement for an optical coupler preferably of the passive, non-active type which can be employed to selectively couple known and predetermined frequencies out of such a multiplex communications system optical path at different points as desired and at different discrete predetermined frequencies for effectively separating the signal information transmitted and conveyed by each such frequency in the multiplexed optical path.

SUMMARY OF THE INVENTION

The passive frequency selective optical coupler of the present invention conceives a first dielectric waveguide which may be either the channel or slab type and a second similar dielectric waveguide having a phase propagation constant at a known frequency which is identical to the phase propagation constant of the first dielectric waveguide at that same known frequency. The concept of the present invention, however, requires that the two dielectric waveguides have different phase propagation constants at all other frequencies.

A portion of the first dielectric waveguide is arranged at proximate spatial disposition relative to the second dielectric waveguide over a sufficient length and extent for selectively coupling light energy between the two waveguides of the known predetermined frequency at which guided modes of the waveguides possess identical phase propagation constants, but for inhibiting coupling between the two optical waveguides at all other frequencies.

In the practice of the present invention the requirement of the two waveguides exhibiting identical guided-mode phase propagation constants at only one known predetermined selected frequency can be achieved by reason of the two dielectric waveguides having different refractive indices or different physical dimensions. Those skilled and knowledgeable in the pertinent arts will readily appreciate that identical phase propagation constants in the first and second dielectric waveguides can be achieved in waveguides which have both different refractive indices and different physical dimensions, or different refractive indices and the same physical dimensions, or the same refractive indices and different physical dimensions. Therefore, in accordance with its concept and teaching, the present invention may be practiced by fabrication adapted to numerous combinations to give effect to the desired result of passive, frequency-selective optical coupling.

Accordingly, it is a primary object of the present invention to provide an improved passive, frequency-selective means for coupling optical energy between two light paths.

An equally important object of the present invention is to provide a frequency-selective coupler for transferring light energy signals between light paths carrying multiplexed signal information.

Yet another important object of the present invention is to provide a passive optical coupler which is adapted to transfer light energy signals at only a known and predeterminable frequency without interfering with other multiplexed signals being transmitted along one or both of the light paths in a multiplexed technique.

A further object of the present invention is to provide such a passive frequency selective optical coupler which is so conceived to be adaptable to operation at a broad range of frequencies.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
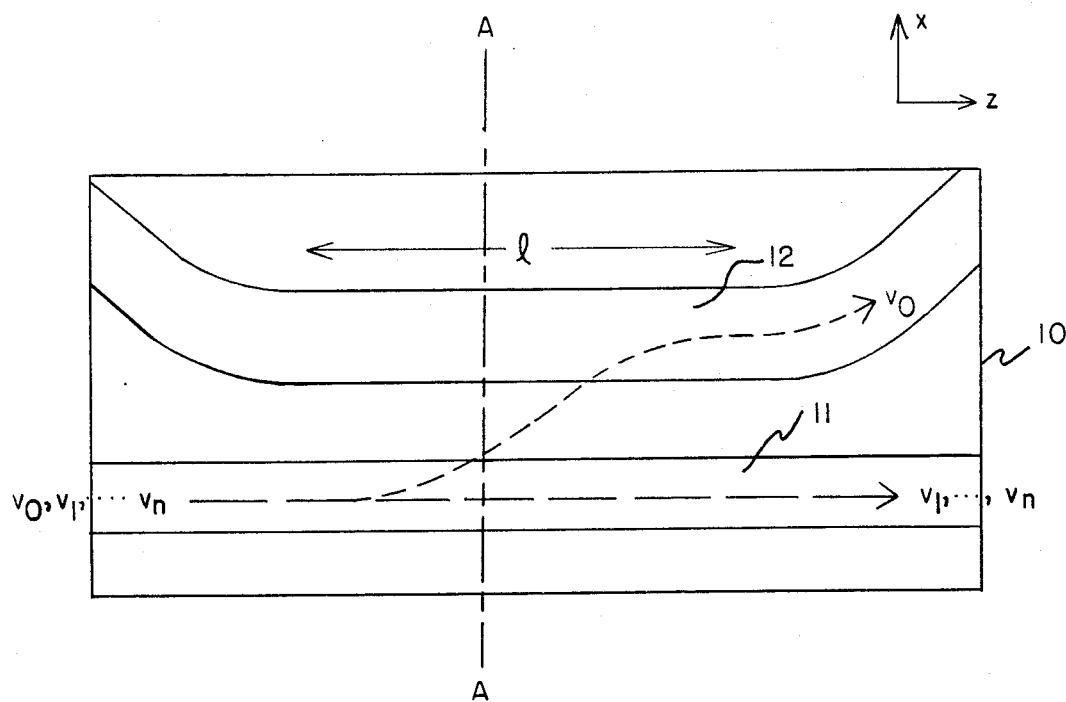
FIG. 1 is a top view of the present invention embodied in a channel type optical waveguide configuration.

FIG. 1 is a top view of an embodiment of the present invention in a channel optical waveguide form. A suitable substrate material 10 supports a first channel dielectric waveguide 11 which is comprised of a substantially higher refractive index material than the substrate 10. Such dielectric material may, for instance, be glass, or plastic, a semiconductor crystalline material (examples of which are GaAs or CdS) or an insulating crystalline material (such as $LiNbO_3$ or NaCl).

A dielectric channel of waveguide material may be deposited on the substrate by a number of known techniques such as ion exchange, ion bombardment, or diffusion, for example. A second channel dielectric waveguide 12 is also supported on a substrate material 10 and in accordance with the concept of the present invention a portion of the first dielectric waveguide 11 is arranged in proximate spatial disposition relative to the second dielectric waveguide 12, preferably parallel, over a sufficient length for selectively coupling light energy at a single known frequency.

Such transfer of optical signals in the form of light energy is given effect by reason of the fact that guided modes of the first and second dielectric waveguides have an identical phase propagation constant at a known predeterminable frequency and different phase propagation constants at all other frequencies. Accordingly, when the first and second dielectric waveguides are arranged in proximate spatial disposition over a sufficient length to produce coupling therebetween, light energy at that known predeterminable frequency only is transferred from one of the dielectric waveguides to the other with no transfer of light energy in other frequencies taking place.

Figure 2:
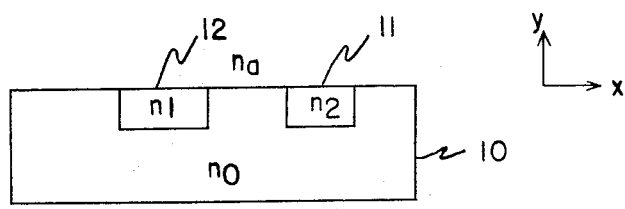
FIG. 2 is an end view of the embodiment of FIG. 1.

FIG. 2 is a cross-sectional view of the channel type embodiment of the present invention illustrated in FIG. 1. It should be noted that the index of refraction of the first channel dielectric waveguide 11 is denoted as $n_1$, while the different index of refraction of the second channel dielectric waveguide 12 is designated $n_2$. Such materials comprising the dielectric waveguides 11 and 12 are supported in a substrate material 10 having a different index of refraction $n_0$, while the surrounding medium, which may be air, for example, has yet another index of refraction which is designated as $n_a$.

Figure 3:
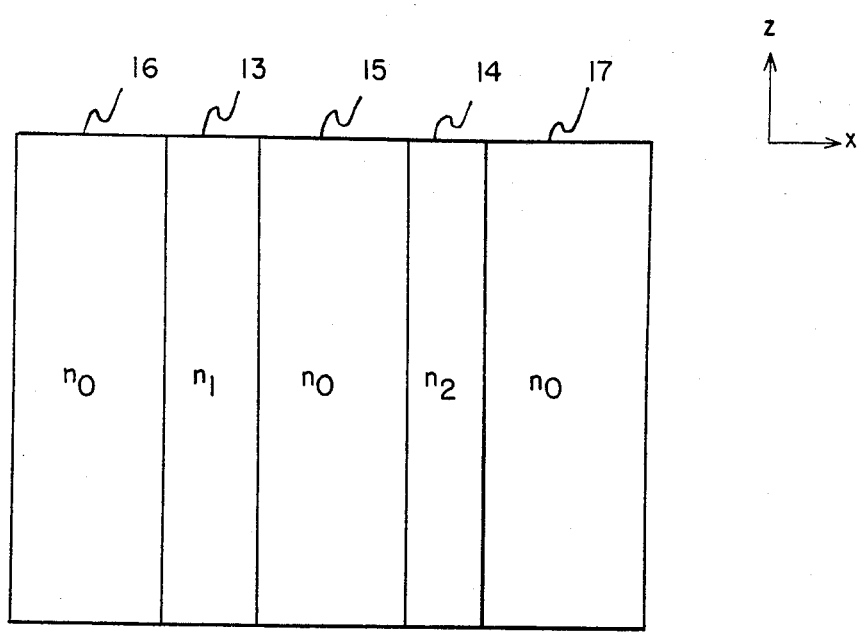
FIG. 3 is an example of the present invention as may be embodied in a slab or planar type of configuration comprising, for example, a laminate of thin films.

FIG. 3 illustrates a top view of a slab or planar type of embodiment of the present invention which may, for example, comprise a laminate of suitable thin films of different materials.

In the configuration as illustrated in the top view of FIG. 3, a first dielectric waveguide 13 comprises material having a refractive index $n_1$, while a second dielectric waveguide 14 comprises a material having a refractive index of $n_2$. The two dielectric waveguides 13 and 14 are separated by a layer or film of material 15 having yet another refractive index $n_0$. The entire composite is completed by two outer films or layers 16 and 17 which similarly have a refractive index of $n_0$. Such thin film multiple layers or laminates may be fabricated by a suitable process such as epitaxial growth of appropriate materials, for example.

Figure 4:
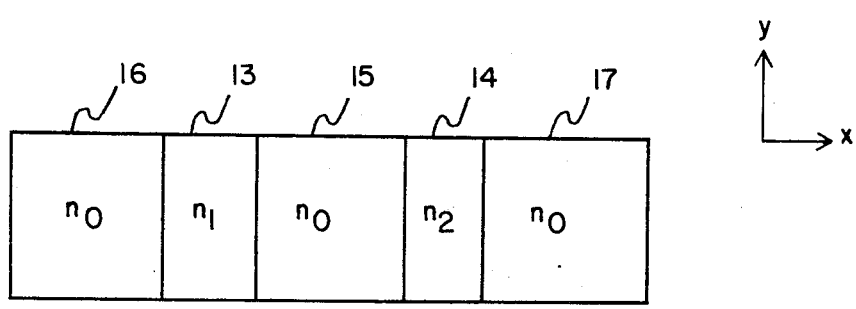
FIG. 4 is an end view of the embodiment of FIG. 3.

FIG. 4 is an end view of the slab or planar type of embodiment of the present invention, a top view of which is illustrated in FIG. 3. It will be noted that unlike the channel waveguide type of embodiment, the dielectric waveguide films 13 and 14 are in the form of laminates or layers rather than embedded channels.

It should be borne in mind that the illustrative drawings are not intended to be strictly dimensionally proportionate representations inasmuch as the actual dimensions involved are extremely small and are therefore not readily adaptable to clear and accurate scalar graphical illustration.

The frequency dependence of coupling between nonidentical waveguides with different dispersion characteristics may be theoretically demonstrated and the efficiency of interguide energy transfer can be related to the difference in guided mode propagation constants for the individual (uncoupled) waveguides. Complete energy transfer will occur when these propagation constants are equal. Parameters for individual waveguides can be chosen such that this condition is satisfied only at one particular discrete selected optical frequency. The extent to which other frequencies are rejected by the coupler depends on the difference in guided mode propagation constants at those other frequencies.

The efficiency of energy transfer between waveguides with unequal guided mode propagation constants may be calculated using approximations appropriate to large waveguide separation. Further, it may be assumed that the refractive index $n$ is a real quantity which varies only in the xy plane and that wave propagation is in the positive z direction. A cartesian component of electric or magnetic field may be expressed as $\mu(x,y) \exp(-i\beta z)$, where, in the scalar wave approximation, $\mu$ satisfies the reduced wave equation $$\frac{\delta^2 \mu}{\delta x^2} + \frac{\delta^2 \mu}{\delta y^2} + (n^2 k_0^2 - \beta^2) \mu = 0.$$

with $\beta$ the propagation constant, $k_0 = 2\pi/\lambda$, and $\lambda$ the free-space wavelength. It is assumed that the two waveguides are centered at $(x_a, y_a)$ and $(x_b, y_b)$. (The locus of the center of a particular waveguide is arbitrarily chosen to correspond to the geometrical center of the energy distribution for the lowest order guided mode). The characteristic equations for the isolated guides, in the absence of coupling, are then $$(Q_0 + Q_a)\mu = \beta^2{}_a\mu, \quad (Q_0 + Q_b)\mu = \beta^2{}_b\mu,$$

where $$Q_0 = \frac{\delta^2}{\delta x^2} + \frac{\delta^2}{\delta y^2} + n_0^2 k_0^2.$$

with $n_0$ a constant, and $Q_a$ and $Q_b$ represent localized increases in refractive index. Real, normalized eigenfunctions for guided modes of the isolated waveguides will be denoted by $f_a$ and $f_b$, respectively. When coupling is introduced the characteristic equation becomes $$Q\mu = \beta^2 \mu \qquad (1)$$

with $Q = Q_0 + Q_a + Q_b$. It is further assumed that solutions to (1), $\mu_1$ and $\mu_2$, are linear combinations of isolated-guide solutions:

$$\mu_1 = (f_a + p f_b)/(1 + p^2)^{1/2} \qquad (2)$$

$$\mu_1 = (p f_a - f_b)/(1 + p^2)^{1/2} \qquad (3)$$

These assumed solutions are normalized and mutually orthogonal if the overlap integral $<f_a|f_b> = \int_{-\infty}^{\infty}\int_{-\infty}^{\infty} f_a f_b \, dxdy$, is neglected. The value of the constant p is determined by the variation method of quantum mechanics as that which maximizes the expectation value $Q_{11}$, defined as $Q_{11} = <\mu_1|Q|\mu_1>$. The result of evaluating this integral is $$Q_{11} = \beta_a^2 + (pM - p^2 \Delta\beta^2)/(1 + p^2).$$

where (4) $\Delta\beta^2 = \beta_a^2 - \beta_b^2$ and $M = <f_a|Q_a|f_b> + <f_b|Q_b|f_a>$. It is assumed that $|<f_a|Q_b|f_a>|$ and $|<f_b|Q_a|f_b>|$ are much less than $|M|$ and the overlap integral $<f_a|f_b>$ has once again been neglected. It is easily shown that these approximations are valid for large waveguide separations.

The value of p which maximizes $Q_{11}$ is $$p = \sqrt{1 + (\Delta\beta^2/M)^2} - \Delta\beta^2/M \quad (5)$$

Substituting this result into (4) and noting that $\beta_1^2$, the largest eigenvalue of (1), is given by $\beta_1^2 = \max_p Q_{11}$ in the variation method approximation, leads to the result $$\beta_1^2 = \tfrac{1}{2}[\sqrt{M^2 + (\Delta\beta^2)^2} - \Delta\beta^2] + \beta_a^2 \quad (6)$$

By setting $\beta_2^2 = <\mu_2|Q|\mu_2>$, with $\mu_2$ given by (3) and p by (5), $$\beta_2^2 = \tfrac{1}{2}[\Delta\beta^2 - \sqrt{M^2 + (\Delta\beta^2)^2}] + \beta_b^2 \quad (7)$$

Finally, subtracting (7) from (6) yields $$\beta_1^2 - \beta_2^2 = \sqrt{M^2 + (\Delta\beta^2)^2} \quad (8)$$

The energy transfer efficiency for the parallel waveguide structure may now be computed. It is assumed that all of the energy is in guide a for $z = 0$. For $z \geq 0$, the field component $U(\bar{r})$ is given by $U = C_1\mu_1 e^{-i\beta_1 z} + C_2\mu_2 e^{-i\beta_2 z}$.
where $C_1$ and $C_2$ are constants. Substituting (2) and (3) into this expression and setting $U|_{z=0} = f_a$, leads to $$U = [e^{-i\beta_1 z}/(1+p^2)][(1 + p^2 e^{i(\beta_1 - \beta_2)z})f_a + p(1 - e^{i(\beta_1 - \beta_2)z})f_b] \quad (9)$$

The fraction of the power transferred to guide b, $w_t$, is $w_t = |<U|f_b>|^2$. Evaluating this integral (neglecting $<f_a|f_b>$) yields $$w_t = \frac{p^2}{(1+p^2)^2} |1 - e^{i(\beta_1 - \beta_2)z}|^2 \quad (10)$$

Complete power transfer ($w_t = 1$) can occur only if $|p| = 1$. It is seen from (5) that $|p| = 1$ only if $\Delta\beta^2 = 0$. This is one condition that must be satisfied at the selected frequency. The other condition is that the length 1, of the coupler is $1 = (2N - 1)\pi/(\beta_1 - \beta_2)$, $N = 1, 2, 3, \ldots$. For the shortest coupler ($N = 1$), it follows from (8), with $\Delta\beta^2 = 0$, that $$1 = \pi(\beta_1 + \beta_2)/M \quad (11)$$

Combining (5), (8), and (11) with (10) leads to $$w_t = (1 + X^2)^{-1} \sin^2[\tfrac{1}{2}\pi(1 + X^2)^{1/2}] \quad (12)$$

with $X = 1\Delta\beta^2/\pi(\beta_1 + \beta_2)$.

An expression obtained for the case of identical waveguides subject to an antisymmetric perturbation in refractive index represents a special case of the more general result in (12). An equivalent result may be derived from a closed-form solution [11, 12] to the coupled-mode equations.

Figure 5:
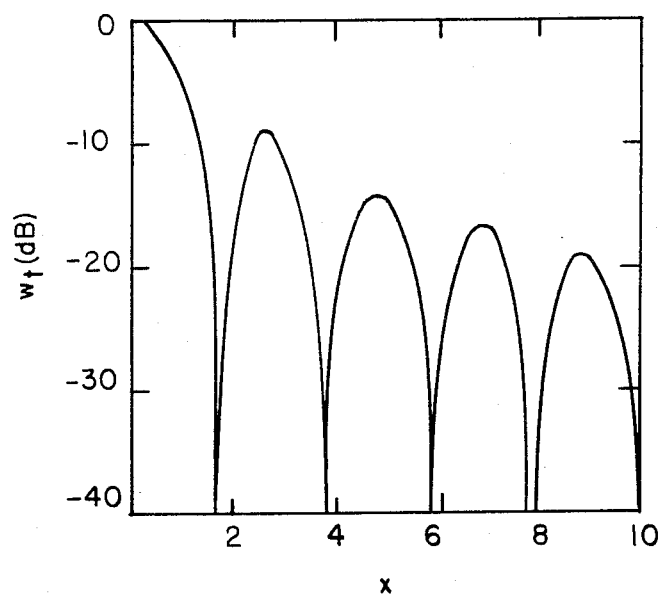
FIG. 5 is the graphical illustration of power transfer efficiency between two dielectric waveguides operating in accordance with the concept of the present invention.

FIG. 5 depicts the decrease in power transfer efficiency with increasing $|X|$. Coupling loss in less than 3 dB for $|X| < 0.79$, and rejection is greater than 20 dB for $|X|$ in the ranges 1.60–1.88, 3.62–4.16, 5.53–6.36, 7.40–8.61, and for $|X| > 9.20$.

Figure 6:
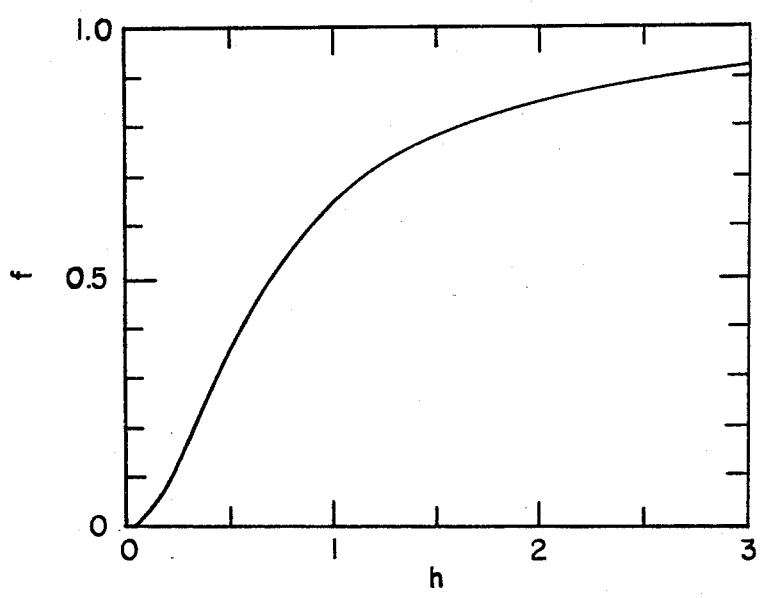
FIG. 6 is a graphical illustration of the principal TE mode of a symmetric slab waveguide.

The frequency dependence of coupling between two waveguides can be calculated from (12), if the dispersion characteristics for individual (uncoupled) guides are known. FIG. 6 presents graphical information on the dispersion of the lowest order TE mode of a symmetric slab waveguide of width W and core refractive index $n_c$ imbedded in a medium of index $n_0$. The ordinate f and abscissa h in that figure are defined by the relations $$f = (\beta^2 - n_0^2 k_0^2)/(n_c^2 - n_0^2)k_0^2$$

and $$h = (2W/\lambda)(n_c^2 - n_0^2)^{1/2}$$

where $\beta$ is the propagation constant.

Complete coupling of energy from guide a to guide b ($w_t = 1$) can occur only if $\beta_a = \beta_b$. In terms of the reduced quantities plotted in FIG. 6 and the guide widths $W_a$ and $W_b$ this condition is expressed as $$h_a^2 f_a/W_a^2 = h_b^2 f_b/W_b^2$$

For two dissimilar guides, this can be satisfied for only one optical frequency, $\nu_0$, corresponding to a wavelength $\lambda_0 = c/\nu_0$. For $[\Delta\nu/\nu_0] \ll 1$, where $\Delta\nu = \nu - \nu_0$, it is easily shown from the definitions of f and h that $$\Delta\beta^2 = 4\pi f_a(n_a^2 - n_0^2)k_0 \frac{\Delta\nu}{\nu_0} \left[\frac{dh}{d\lambda}\left(\frac{1}{h} + \frac{1}{2f}\frac{df}{dh}\right)\frac{h_b}{h_a}\right]$$

If dispersion in the propagation medium is small compared to waveguide dispersions this simplifies to $$\Delta\beta^2 = -f_a(n_a^2 - n_0^2)k_0^2 \frac{\Delta\nu}{\nu_0}\left[\frac{h}{f}\frac{df}{dh}\bigg|_{h_a}^{h_b}\right] \quad (13)$$

Figure 7:
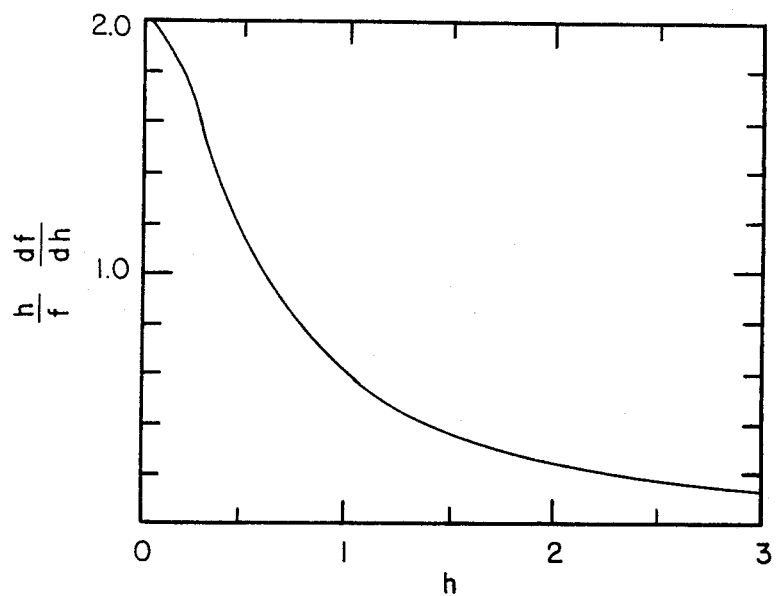
FIG. 7 is a graphical illustration of the quantity $(h/f) \, df/dh$ vs. $h$ for the principal TE mode of the slab waveguide.

The quantity $(h/f)df/dh$, which is needed to evaluate (13), is plotted as a function of h in FIG. 7.

The previous results can be used to calculate the frequency dependence of coupling for a particular pair of slab waveguides. We consider the case of a single waveguide carrying several discrete frequencies $\{\nu_n\}$ with uniform interfrequency spacing $\Delta\nu_{10}$, which is coupled to a second guide over a propagation length l, as illustrated in FIG. 1. Since, from (13), $\Delta\beta^2$ is proportional to $\nu - \nu_0$, it follows that the values of $\Delta\beta^2$ corresponding to the frequencies $\{\nu_n\}$ will also be spaced uniformly. The separation between values of $\Delta\beta^2$ will be denoted by $\Delta\beta^2_{10}$. It follows from (12) that if $$\Delta\beta^2_{10} = 1.88(\beta_1 + \beta_2)/l$$

then $w_2 < 20$ dB for $(v_n)$, $n \neq 0$. Substituting the result for $\Delta\beta_{10}^2$ into (13), and noting that $\beta_1 + \beta_2 \approx 2\beta_a$, leads to the expression $$(1/\lambda_0)(n_a - n_0)(\Delta v_{10}/v_0) = 0.94 \left[ \left| \frac{h}{f} \frac{df}{dh} \bigg|_{h_c}^{h_b} \right| f_a \right] \left[ \frac{2\sqrt{f_a(n_a^2 - n_b^2) - n_c^2}}{n_a + n_0} \right] \quad (14)$$

Figure 8:
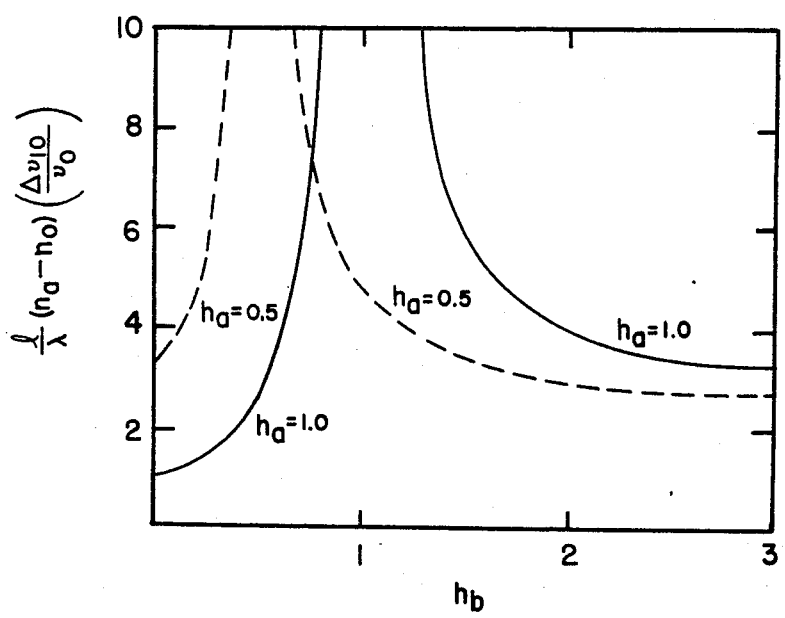
FIG. 8 is a graphical illustration of the quantity $(1/\lambda_o)(N_a - N_a)(\Delta v_{10}/v_o)$ is plotted as a function of $h_b$ for $h_a = 0.5$ and $h_a = 1.0$.

The quantity $(1/\lambda_0)(n_a - n_0)(\Delta v_{10}/v_0)$ is plotted in FIG. 8 as a function of $h_b$ for $h_a = 0.5$ and $h_a = 1.0$. This plot assumes that the quantity in brackets equals unity, an approximation valid for $n_a - n_0 \ll n_0$.

Results for slab waveguides indicate that the most effective frequency selection occurs for waveguides which differ considerably in width and core refractive index. The calculations indicate that, with a maximum core-substrate index difference of 0.1, couplers designed for an interfrequency spacing of a few tenths of a percent of the central frequency at near-infrared wavelengths can be achieved in a 1 cm-long device. Even smaller interfrequency spacing is allowed if refractive index differences are larger than 0.1.

The method applied here to obtain numerical results for slab waveguides can be used to compute the frequency dependence of coupling between any two waveguides with known guided-mode dispersion characteristics. This follows from the fact that the result in (12) is not restricted to a particular waveguide geometry.

The couplers of the present invention can remove light of one frequency from a waveguide carrying many different frequencies. The same couplers can also perform the complementary function of combining light of one frequency with other frequencies in a single waveguide. Both functions may be needed in carrier-frequency multiplexing for fiber optics communications.

It will be readily appreciated by those skilled in the pertinent art that the concept of the present invention is not limited to the type of dielectric waveguides for which the foregoing theoretical calculations are formulated, but may be applied to other types of dielectric waveguides, one alternative example of which is the thin film laminate of multiple layer type. Essentially, it is sufficient in accordance with the concept and teaching of the present invention that the two waveguides have a propagation constant at a known or determinable frequency which is identical but the waveguides exhibit different propagation constants for all other frequencies and moreover that the two waveguides be suitably positioned and arranged as to spatial disposition over a length which is sufficient to complete coupling at the known and determinable frequency for which the two waveguides exhibit the identical propagation constant.

Obviously many modifications and variations of the present invention are possible in the light of the above teachings. It is therefore to be understood that within the scope of the appended claims the invention may be practiced otherwise than as specifically described.

What is claimed is:

1. A passive frequency-selective optical coupler comprising:
    a first dielectric waveguide having a combination of dimensions and refractive index for producing a determinable guided mode phase propagation constant of light energy at a known frequency;
    a second dielectric waveguide having a different combination of dimensions and refractive index for producing a guided mode phase propagation constant at said known frequency identical to that of said first dielectric waveguide at said known frequency and producing different phase propagation constants at all other frequencies; and
    a portion of said first dielectric waveguide arranged in proximate spatial disposition relative to said second dielectric waveguide over a sufficient length for selectively coupling light energy therebetween at said known frequency only.

2. A passive frequency-selective optical coupler as claimed in claim 1 wherein said first and second dielectric waveguides have different refractive indices.

3. A passive frequency-selective optical coupler as claimed in claim 2 wherein said first and second dielectric waveguides have the same physical dimensions.

4. A passive frequency-selective optical coupler as claimed in claim 1 wherein said first and second dielectric waveguides have different physical dimensions.

5. A passive frequency-selective optical coupler as claimed in claim 4 wherein said first and second dielectric waveguides have the same refractive indices.

6. A frequency-selective optical coupler as claimed in claim 1 wherein said first and second dielectric waveguides are of a channel type.

7. A frequency-selective optical coupler as claimed in claim 6 wherein said first and second dielectric waveguides are supported on a common substrate material.

8. A frequency-selective optical coupler as claimed in claim 1 wherein said first and second dielectric waveguides are of a slab type.

9. A frequency-selective optical coupler as claimed in claim 8 comprising a laminate of thin films.

* * * * *